Nov. 27, 1934. E. CLEMENS Re. 19,379
BUTTON MAKING MACHINE
Original Filed June 3, 1930 2 Sheets-Sheet 1
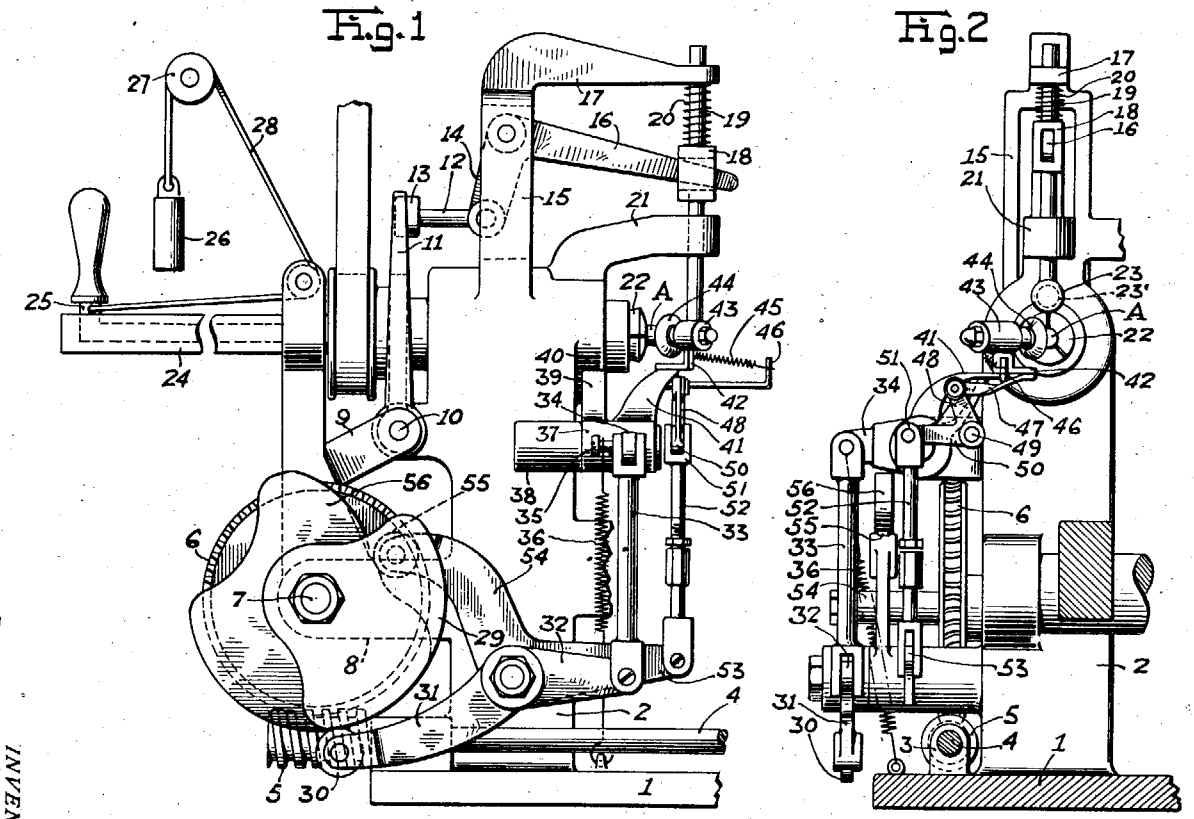
INVENTOR
EMANUEL CLEMENS
BY William A. Hardy
ATTORNEY Nov. 27, 1934. E. CLEMENS Re. 19,379
BUTTON MAKING MACHINE
Original Filed June 3, 1930 2 Sheets-Sheet 2
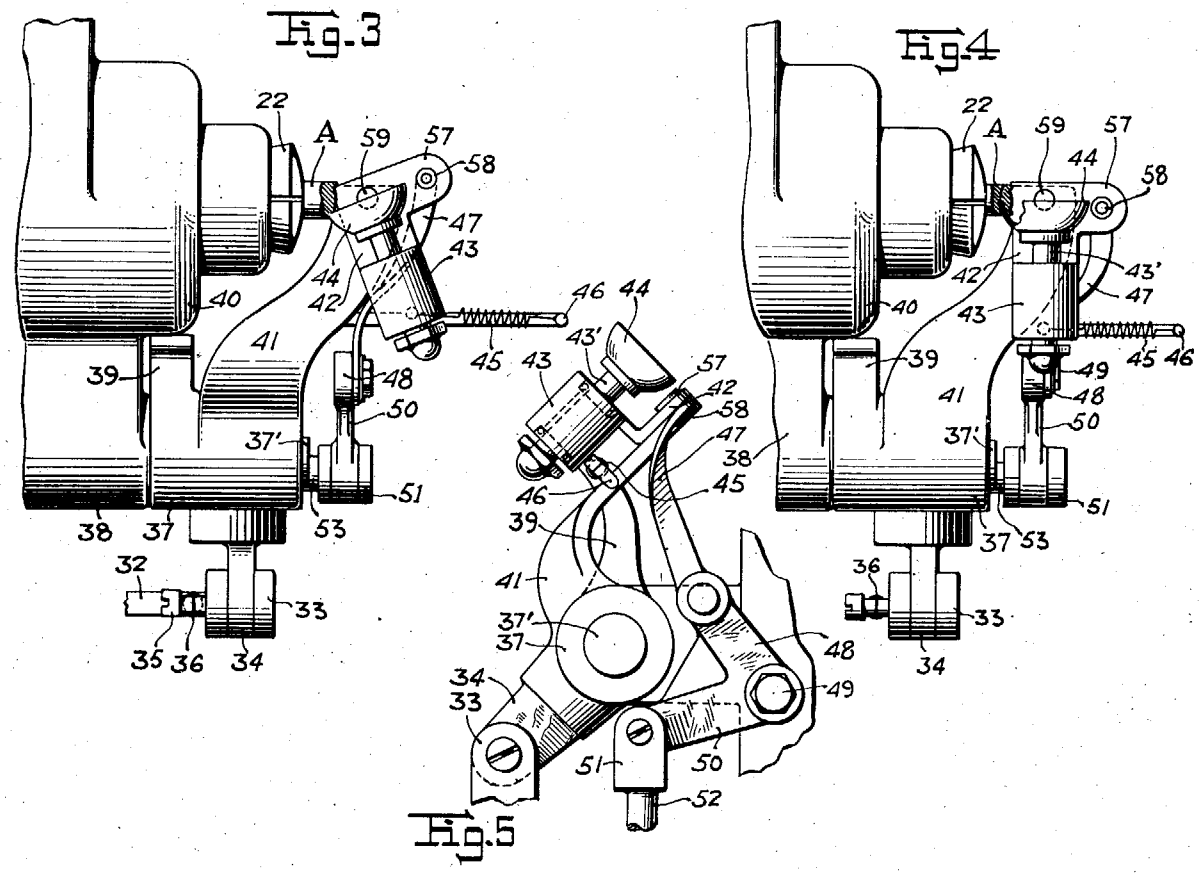
INVENTOR
EMANUEL CLEMENS
BY William A. Hardy
ATTORNEY Reissued Nov. 27, 1934

Re. 19,379

UNITED STATES PATENT OFFICE 19,379

BUTTON MAKING MACHINE

Emanuel Clemens, East Orange, N. J.

Original No. 1,843,944, dated February 9, 1932, Serial No. 459,042, June 3, 1930. Application for reissue November 14, 1933, Serial No. 697,919

7 Claims. (Cl. 79—1)

This invention relates to button making machines, and more particularly to a machine for making buttons from rods of casein products.

The use of casein products in the manufacture of buttons has become widespread, and in my U. S. Letters Patent, No. 1,819,811, dated August 18, 1931, there is described a machine for making buttons from rods formed of such products.

Heretofore, it has been necessary to "cure" the rods before they were in condition for button making, the curing process usually requiring from three to four months. The time required makes the use of the rods objectionable, in that a large stock of cured rods must be kept on hand in order to meet emergencies.

It has been found that buttons made from "uncured" casein product may be cured in three or four days, and it is an object of this invention to provide a machine of improved construction for effectively making buttons from uncured rods of a casein product.

A further object is the provision in a machine of this character of an improved and novel construction for effectively cutting buttons from a rod being operated upon and a preferred embodiment of which comprises a device having a cutter so formed and actuated as to shape the rear face of a button and subsequently to sever the button from the rod.

A further object is the provision of means for automatically controlling the positions and cutting actions of the cutter.

These and other advantageous objects are attained by the novel construction, combination and arrangement of parts hereinafter described and shown in the accompanying drawings, constituting a material part of this disclosure and in which:

Figure 1 represents a side elevational view of a button making machine embodying the invention.

Figure 2 represents a front elevational view of the machine.

Figure 3 represents an enlarged plan view of a portion of the machine, including the cutter and associated parts.

Figure 4 represents a view similar to Figure 3 showing the cutter in an operative cutting position, and Figure 5 represents an enlarged side elevational view of a portion of the machine, including the cutter and certain associated parts.

Referring to the drawings, particularly to Figures 1 and 2, the machine is shown to include a base 1, with an upstanding main support 2. Journalled in a bearing 3 on the base is a shaft 4 driven by a source of power, not shown.

The shaft 4 carries a worm 5 in mesh with a worm wheel 6, the latter being fixed to a shaft 7, journalled in a bearing 8 integral with the main support 2.

Mounted on shaft 7 is a cam (not shown) which engages arm 9, rotatably mounted on a shaft 10, journalled in a bearing on the support 2, the arm 9 being integral with an upstanding arm 11, the latter having an aperture at its extremity through which passes a rod 12, having a collar 13 engaged by the arm 11.

The arm 11 has a to and fro movement to actuate a bell crank 14 connected with rod 12 and rotatably mounted on an upstanding support 15. Arm 16 of the bell crank engages a block 18 fixed to a rod 19, the latter passing through an upper guide bracket 17 provided on the support 15 and being normally urged downwardly by a compression spring 20 interposed between the block 18 and the bracket 17.

The rod 19 is also guided by a lower bracket 21, and the lower extremity of the rod is provided with a head 23 carrying a rotatable element 23′ adapted to be periodically lowered into and raised from the path of a rod A preferably formed of an "uncured" casein product. The rod A is releasably held in a rotatable chuck 22 which is driven at high speed when the machine is in operation; and when the rod is released it is urged in a longitudinal direction and forwardly in the chuck by a rod 24 having an upstanding end portion 25 to which is connected a cable 28, the latter passing over a pulley 27 and being connected to a weight 26. The construction and arrangement are such that when the rod A is released the element 23′ on rod 19 will lie in the path of rod A so as to limit the forward movement of the latter in chuck 22. This structure is described in detail in my Patent No. 1,819,811, above referred to.

Fixed to shaft 7 is a cam 29 engaged by a roller 30 mounted on an arm 31 of a rocker 32, which is pivotally connected to a vertical link 33, the latter being pivotally connected to an arm 34 of a rocker 37 rotatably mounted on a shaft 37′ journalled in a bearing 38 integral with support 2.

Projecting from the upper end of link 33 is a pin 35 to which is connected a tension spring 36, the latter being also connected to the base 1, to constantly urge the arm 34 downwardly.

Upward movement of arm 34 is limited by the engagement of the stop 39 with the portion 40 of the support 2, the stop 39 being integral with the rocker 37.

The other arm 41 of rocker 37 supports the cutter which acts on the rod A to cut buttons therefrom. While in all cases the cutter should be freely rotatable in respect of its mounting, the form of the cutter and the construction and arrangement employed for mounting the same and for effecting the movements thereof to and from operative cutting position, are dependent upon the shape desired for the rear faces of the buttons. In case the buttons are to have the usual convexed rear faces, a cup-shaped cutter 44 is used and the mounting of the cutter and the means (in addition to rocker 37 and its actuating mechanism) employed for moving the same to and from operative position are preferably such as will now be described.

The arm 41 of rocker 37 has pivoted thereto at 59, a small bracket 42 which supports a bearing 43 in which is journalled for free rotation a stub shaft 43', the latter having fixed thereto the cup-shaped cutter 44. A tension spring 45 is connected to the opposite end of bearing 43 and to the up-turned end of a rod 46, the latter being supported by the arm 41.

A lateral extension 57 of the bracket 42 is pivotally connected at 58 to a link 47, which is pivotally connected to the arm 48 of a bell crank rotatably mounted at 49 on the support 2.

The other arm 50 of the bell crank is pivotally connected to the spaced ears 51 integral with a vertical link 52, the latter being in turn pivotally connected to the arm 53 of a rocker having an arm 54 provided with a roller 55 in engagement with a cam disc 56 attached to shaft 7, the rocker being rotatably mounted on a stub shaft projecting from the main support 2.

In operation, the rod A is intermittently fed forward in the chuck 22 to present sections to be formed into buttons, the movement of the rod being limited by the head 23 which subsequently moves upwardly out of the path of a tool (not shown) for facing the button, the facing tool and means for actuating the same being clearly described in my Patent No. 1,819,811, referred to above.

As the rod A is being fed forwardly, cam 29, which together with the cam 56, is moved by shaft 7 in a clockwise direction (referring to Figure 1), acts through rocker 32 and link 33 to move arm 41 of rocker 37 downwardly and thereby to bring the cutter 44 on a level with the rod, as shown in Figures 1 and 2. The arm 41 in such downward movement thereof, causes link 47 to move rearwardly about its pivotal connection with the arm 48 of the bell crank pivoted at 49, the point of which pivotal connection, however, is offset in two directions with respect to the pivotal axis of rocker 37. Consequently, by way of compensation, link 47 in such rearward movement thereof, pulls on arm 48 to turn the bell crank sufficiently in a clockwise direction to move the arm 50 thereof upwardly from the position shown in Figure 5 to a substantially horizontal position, and also pulls on extension 57 of bracket 42 to move the latter sufficiently about pivot 59 against the action of spring 45, to bring the cutter 44 into its cutting position. The upward movement of arm 50 is necessarily accompanied by corresponding upward movement of link 52. To provide for such movement of link 52, cam 56 is formed as shown so that roller 55 rides inwardly thereon from a long high "dwell" to a short low dwell, during the abrupt outward movement of roller 30 on cam 29, from the low to the high dwell of the latter, which effects the above described downward movement of arm 41. Figures 1, 2 and 3 show the various parts in the positions they now occupy.

In the continued clockwise movement of cams 29 and 56, roller 30 merely rides over the long high dwell of cam 29 while the positions of rocker 32, link 33 and rocker 37 remain unchanged; the roller 55 in the meantime first riding outwardly on cam 56 from the short low dwell to a short high dwell and through the link 52, the bell crank pivoted at 49 and the link 47, acting to move bracket 42 pivotally in a clockwise direction against the action of spring 45 and forcing the freely rotatable cutter 44 into engagement with the rapidly rotating rod A and to the position shown in Figure 4 to cause the same to cut, form and sever a button from the rod, then riding idly over the said short high dwell without effecting further change in the positions of link 52, bell crank arms 50 and 48, link 47, bracket 42 and cutter 44, and finally moving inwardly from said high short dwell to the bottom of an adjacent notch in the cam 56, thereby effecting swinging return movement of bracket 42 and cutter 44 in a reverse or counterclockwise direction to the position shown in Figure 3 (in which they do not interfere with advancing movement of the rod A in chuck 22) and of bell crank arms 48 and 50 in a clockwise direction to the positions shown in Figure 2. When the freely rotatable cutter is forced into engagement with the rotating rod A as just above described, said rod causes the cutter to rotate at the proper speeds to cut the rod and to form and sever a button therefrom without tearing or "smearing" the uncured casein material of which the same is preferably composed.

Upon the further clockwise and rotary movement of cams 29 and 56 through a comparatively small angle, roller 30 moves abruptly inwardly on cam 29 from the long high dwell of the latter to the low dwell thereof. Simultaneously roller 55 rides outwardly from the bottom of the above-mentioned notch in cam 56 to the long high dwell of the latter. These movements of rollers 30 and 55 on their respective cams effect the return of the cutter 44 and associated parts to the positions shown in Figure 5 and wherein they do not interfere either with the button facing tool and its actuating means or with the advancing of rod A in the chuck 22.

The foregoing is a description of the cycle of operations which take place in one complete rotation of shaft 7, which cycle is repeated in each subsequent rotation of said shaft and for each advance movement of rod A in the chuck 22.

The rod A is solid, as distinguished from a hollow rod or pipe, and as hereinbefore indicated, such rod is uncured and fairly soft, and the cutting action of cutter 44 is easy and rapid. The cutting action may also be facilitated by oiling the cutter after each operation.

After the buttons have been cut from the rod A, they may be conveniently "cured" and hardened in three or four days.

The foregoing disclosure is to be regarded as descriptive and illustrative only, and not as restrictive or limitative of the invention, of which obviously various embodiments may be constructed including many modifications without departing from the general scope herein indicated and denoted in the appended claims.

Having thus described my invention, what I claim as new and desire to secure by Letters Patent, is:

1. In a machine for making button blanks from solid uncured rods of casein material, driving means, a device operable by said driving means for suporting and rotating such a rod, a movably mounted knife-edged cutter freely rotatable about its axis and on its mounting by contact with the rotating rod, and means operable during operation of the machine for moving the cutter automatically and intermittently to and from operative cutting position relatively to said rod when the latter is supported and rotated by said device.

2. In a machine for making button blanks from solid uncured rods of casein material, driving means, a device operable by said driving means for supporting and rotating such a rod, a swingably mounted cup-shaped and knife-edged cutter freely rotatable about its axis and on its mounting by contact with the rotating rod, and means operable during operation of the machine for moving and swinging the cutter automatically and intermittently to and from operative cutting position relatively to said rod when the latter is suported and rotated by said device.

3. In a machine for making buttons from a rod of suitable material, a support, an arm rotatably mounted on the support, a bracket pivoted on the arm, a bearing supported by the bracket, a stub shaft journalled in the bearing, a cup-shaped cutter fixed to the shaft, means to periodically move the arm to place the cutter in a position adjacent the rod, and means to swing the bracket on the arm to urge the cutter into cutting engagement with the rod.

4. In a machine for making buttons from a rod of suitable material, a support, an arm rotatably mounted on the support, a bracket pivoted on the arm, a cup-shaped cutter rotatably mounted on the bracket, means to move the arm to place the cutter in a position adjacent the rod, and means to swing the bracket to urge the cutter into cutting engagement with the rod.

5. In a machine for making buttons from a rod of suitable material, a cup-shaped cutter for shaping and severing a button from the rod, a bracket upon which the cutter is rotatably mounted, means for moving the bracket periodically vertically to a position adjacent the rod, means for swinging the bracket horizontally to urge the cutter into cutting engagement with the rod.

6. In a machine for making buttons from a rod of suitable material, a support, an arm rotatably mounted on the support, means for periodically moving the arm through a predetermined arc, a bracket swingably mounted on the arm, a cup-shaped cutter rotatably mounted on the bracket, said cutter rotating in a plane transverse to the plane of rotation of the arm, and means to periodically swing the bracket in a plane transverse to the planes of rotation of the cutter and arm.

7. In a machine for making buttons from a rod of suitable material, a support, an arm rotatably mounted on the support, means for periodically moving the arm through a predetermined arc, a bracket swingably mounted on the arm, a cup-shaped cutter rotatably mounted on the bracket, and means to periodically swing the bracket in a plane transverse to the plane of rotation of the arm.

EMANUEL CLEMENS.